Feb. 13, 1923.
J. REICHERT.
PEDAL EXTENSION.
FILED NOV. 17, 1921.
1,445,355.
2 SHEETS—SHEET 2.
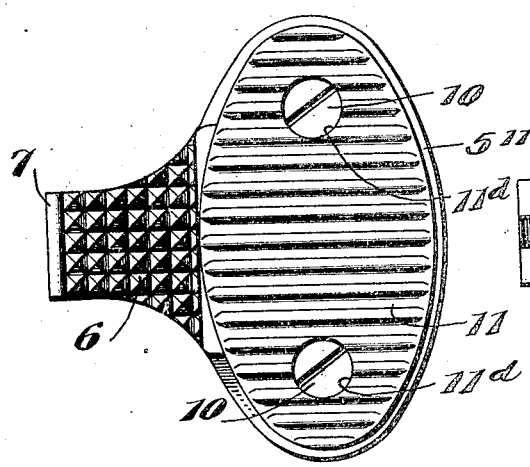
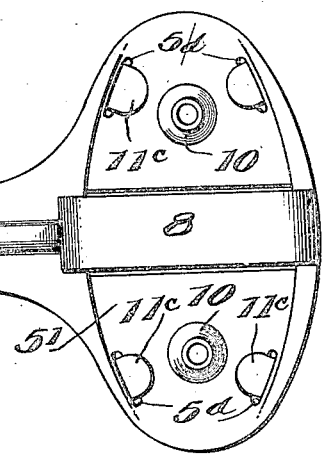
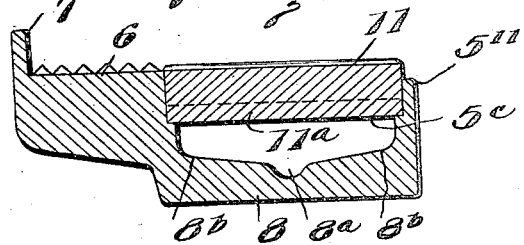
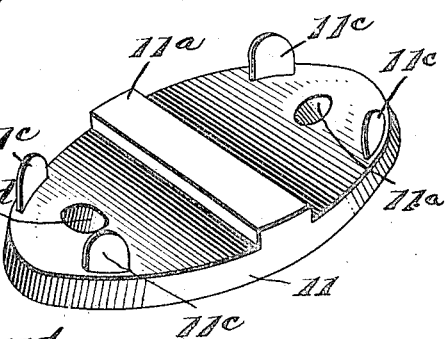
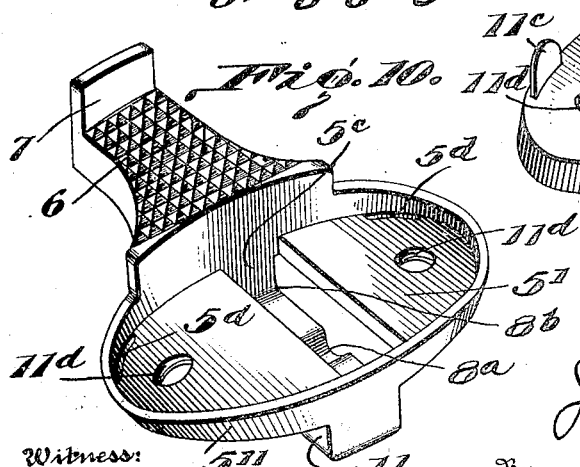
Inventor
John Reichert
By
Hubert Peck Attorney
Witness:
Robert F. Beck Patented Feb. 13, 1923.

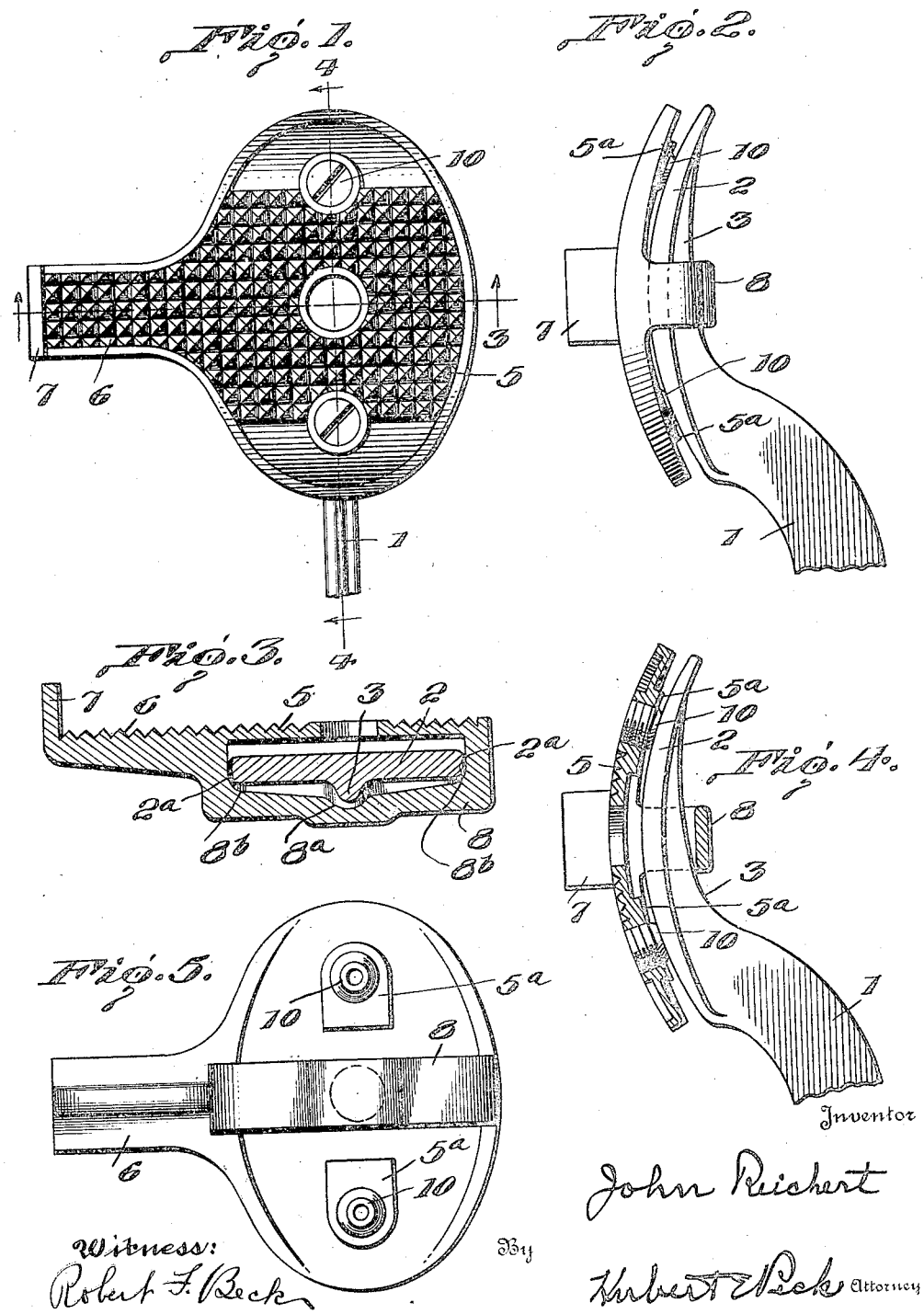

1,445,355

UNITED STATES PATENT OFFICE.

JOHN REICHERT, OF RACINE, WISCONSIN.

PEDAL EXTENSION.

Application filed November 17, 1921. Serial No. 515,772.

*To all whom it may concern:*

Be it known that I, JOHN REICHERT, a citizen of the United States of America, and a resident of Racine, county of Racine, State of Wisconsin, have invented certain new and useful Improvements in and Relating to Pedal Extensions, of which the following is a specification.

This invention relates to so-called attachable pedal caps or extensions for application to automobile foot pedals; and the objects and nature of the invention will be readily understood by those skilled in the art in the light of the following explanations of the accompanying drawings illustrating what I now believe to be the preferred mechanical expressions or embodiments of my invention from among other forms, constructions, and arrangements within the spirit and scope thereof.

It is an object of this invention to provide an exceedingly simple and strong pedal extension which can be readily applied to and clamped on an automobile pedal, particularly one of the Ford type, and wherein the clamping devices are readily accessible and wherein the contact points or areas between the extension and pedal are so arranged and located as to reduce possibility of objectionable looseness and rattling as well as danger of misplacement of the extension on the pedal, to the minimum.

With these and other objects in view, my invention consists in certain novel features of construction and in combinations and arrangements as more fully and particularly set forth and specified hereinafter.

Referring to the accompanying drawings:

Fig. 1 is a front elevation of a pedal extension embodying my invention located on a pedal, shown in part.

Fig. 2 is an edge elevation of the structures of Fig. 1.

Fig. 3 is a transverse section on the line 3—3, Fig. 1.

Fig. 4 is a vertical section on the line 4—4, Fig. 1.

Fig. 5 is a detail rear elevation of the extension.

Fig. 6 is a face elevation of the extension of my invention equipped with a rubber face pad.

Fig. 7 is a rear elevation of the device of Fig. 6.

Fig. 8 is a cross section thereof.

Fig. 9 is a detail perspective of the rubber pad.

Fig. 10 is a detail perspective of the extension with the pad removed.

I show in part a foot control pedal of the type employed in Ford automobiles, embodying shank 1 and upright foot plate 2 rigid with the free end of the shank while the plate is braced at the rear by tapered rib 3 forming a longitudinal tapered upward continuation of the shank longitudinally and centrally of the rear side of the plate. This plate usually is oval in form and arched to present a longitudinally convexed front face to the foot.

As is well understood by those skilled in the art, certain difficulties and dangers are incidental to the use of these pedals; and it is one of the objects of my invention to provide a simple and effective cap, extension or attachment for such pedals designed to overcome these difficulties.

In the particular embodiment of my invention illustrated by Figs. 1 to 5, the extension embodies a longitudinally arched face plate 5 conforming to the curvature of the pedal plate 2 and of approximately the same length although of somewhat greater width than said pedal plate. This face plate is formed integral with lateral extension or arm 6 at its free end having upstanding lip or flange 7. The face plate is also formed integral with a rear transverse bridge piece 8 providing a transverse loop at the rear of the face plate to receive the pedal plate and its bracing rib. This bridge 8 is longitudinally alined with the longitudinal axis of the extension arm 6 and one end of the loop merges into the base of said arm so that the arm in effect forms a longitudinal continuation of the loop, although I do not wish to so limit all features of my invention. In this embodiment the arm is located midway the length of the face plate with the bridge extending from edge to edge of the face plate to form a transverse loop of greater length than the outside greatest width of the pedal plate and of greater width or depth than the thickness of the pedal plate excluding the rib 3.

The bridge 8 is formed with a transverse central groove or depression 8ª to receive the rib 3 of the pedal plate, and the bridge preferably slopes or inclines longitudinally from its opposite ends toward said groove 8ª, at its edge adjacent the face plate 5 to provide inclined or sloping bearing faces or high points 8$^b$ for engagement with the rear side of the pedal plate at points midway the length of said plate and near the side edges thereof. The rear side of the face plate 5 is also preferably formed with raised bearing points or bosses 5$^a$ at the upper and lower or opposite end portions of said face plate, to oppose the front face of the upper and lower end portions of the front face of the pedal plate. The bosses 5$^a$ are preferably arranged along the longitudinal central line of the face plate and the rear bearing or abutting surfaces 8$^b$ are preferably arranged midway the length of the pedal cap or extension.

I provide easily operated and accessible means for clamping the pedal cap or extension on the pedal and thereby avoid the difficulties experienced in the use of pedal extensions heretofore employed wherein the clamping devices are accessible only from behind the pedal at an almost inaccessible location in automobiles.

In the example illustrated, I show tapped machine screw holes extending completely through the end portions of the face plate that include the bosses 5$^a$, from front to rear, and containing headless machine screws 10 having screw driver receiving slots at their outer ends accessible at the front or foot receiving face of the plate. The contact ends of the two screws 10 extend through the bosses 5$^a$ to abut the opposite end portions of the pedal plate, while the opposite or slotted ends of the screws lie flush with or below the foot receiving face of the face plate 5.

The pedal cap or extension is formed to slip down either end foremost, (with the arm 6 extending to either the left or to the right) over a pedal plate with the bridge traversing the back side of the plate and receiving the rib 3, until the face plate 5 faces the pedal plate and assumes the desired position with respect thereto. Thereupon the screws 10 are rotated to bear against the pedal plate to force the face plate 5 away from the pedal plate 2 and draw the two bearing surfaces 8$^b$ into tight engagement with the back opposite edge portions 2$^a$ of the pedal plate 2. The cap or extension is thus clamped or held at four bearing or abutting points 5$^a$, 8$^b$, at its opposite ends and opposite sides or edge portions, and thereby firmly held and braced against tilting or loosening and against vibration with respect to the pedal and consequent rattling.

There is ample room between the vehicle front seat and the foot pedals for easy inspection and manipulation of the pedal caps or extensions and for use of screw drivers or other implements in adjusting the clamping screws when arranged and accessible as in my device hereof.

If a screw becomes loose it can be easily tightened through the foot bearing face of plate 5 while the complete bridge 8 prevents the cap or extension dropping down from the pedal plate onto the pedal shank should the screws work loose. However, should a screw work outwardly to an extent to project beyond the foot bearing face of plate 5, the engagement of the foot with the projecting screw would at once warn the operator.

If so desired, the pedal cap or extension of my invention can be equipped with a rubber or like material friction or cushioning pad or face block. For instance, in Figs. 6 to 10 I show the pedal extension formed to receive a rubber or like pad 11 to constitute the foot engaging portion of the device. In this form, a face plate 5' is provided with a surrounding upturned rim 5''; to form a socket to receive the pad. The plate 5' is also formed with a transverse socket or slot 5$^c$ to more or less snugly receive a transverse lug 11$^a$ formed on the back of the rubber pad. The face plate 5' is also formed with several spaced slots 5$^d$ usually at its end portions, to receive sheet metal or other attaching lips 11$^c$ projecting from the rear face of the rubber pad. The rubber pad 11 is usually molded with one or more metal plates embedded therein and provided with the lips 11$^c$ and forming anchors therefor. The rubber pad is also formed with holes 11$^d$ alined with the tapped screw holes in plate 5' and the screws therein. The rubber pad fits snugly and removably in the seat in plate 5' formed therefor and is secured therein by the lips 11$^c$ which project through slots 5$^d$ and are bent down against the rear of the plate 5'. The lug 11$^a$ fitting in the slot 5$^c$ also aids in bracing and holding the pad against loosening movement in the plate. The screws are easily accessible through the holes 11$^d$ in the pad. The pads can be easily applied, and can also be easily removed for renewal.

It is evident that various changes, modifications and variations might be resorted to without departing from the spirit and scope of my invention and hence I do not wish to limit myself to the exact disclosures hereof.

What I claim is:

1. A pedal extension embodying a plate shaped to approximately conform to the shape of the foot side of the pedal plate and at its back formed with an abutment to engage the back of the pedal, said extension plate having a tapped screw hole therethrough, and a clamping screw therein to abut the foot face of the pedal plate and accessible from the foot side of said extension, whereby loosening of the screw will cause warning contact thereof with the foot of the operator.

2. A pedal extension embodying a plate to cover the pedal plate and at the back having a transverse bridge to abut the pedal at the back approximately midway the length of the pedal plate, and clamping screws adjustable in the end portions of said plate of the extension to abut the foot face of the pedal plate and accessible at the foot face of the extension whereby three bearing points are provided between the extension plate and the pedal plate.

3. A pedal extension formed to longitudinally slip down onto and transversely embrace the pedal plate and bear against the back thereof at its opposite edge portions midway its length, said extension embodying a foot plate provided with clamping screws adjustable therethrough to abut the foot face of the pedal plate above and below its transverse center, said screws being adjustable from the foot face of the extension.

4. A pedal extension formed to longitudinally slip down onto and transversely embrace a pedal plate and providing abutments to bear against the pedal plate back to hold the extension against transverse rocking on the pedal, the upper and lower end portions of said extension provided with central set screws adjustable therethrough from the foot face of the extension to abut the foot face of the pedal above and below its transverse center and lock the extension to the pedal against looseness and rattling and rocking on a transverse axis.

5. A pedal extension at its back formed with a bridge providing two back abutments to engage the back of the pedal plate approximately midway its length, said extension embodying a front plate provided with two upper and lower clamping screws adjustable therethrough from the foot face of the extension plate to abut the foot face of the pedal plate and constitute the front abutments between said plates.

6. A pedal extension formed to slip down over a pedal plate and abut the back thereof and provided with set screws adjustable through the extension from the foot face thereof to abut the foot face of the pedal plate, and a cushioning foot pad removably secured on and fitted in the foot face side of the extension and provided with holes alined with said screws and through which they are adjustable and readily accessible from the foot face side of said pad.

7. A pedal extension formed to slip down over a pedal plate and abut the same at the front and back and provided with adjustable clamping means for locking the extension on the pedal, said extension having a seat with a depression and slots, and a cushioning foot pad fitted in said seat and having a lug entering said depression and securing lips extending through said slots and bent.

JOHN REICHERT.